Aug. 7, 1962 E. H. SCHERER 3,048,784
BINARY INPUT-AC WAVE OUTPUT SELECTOR USING BIPOLAR
GENERATOR, INTEGRATOR, AND LOW PASS FILTER
Filed Oct. 9, 1959 2 Sheets-Sheet 1
Fig. 1.
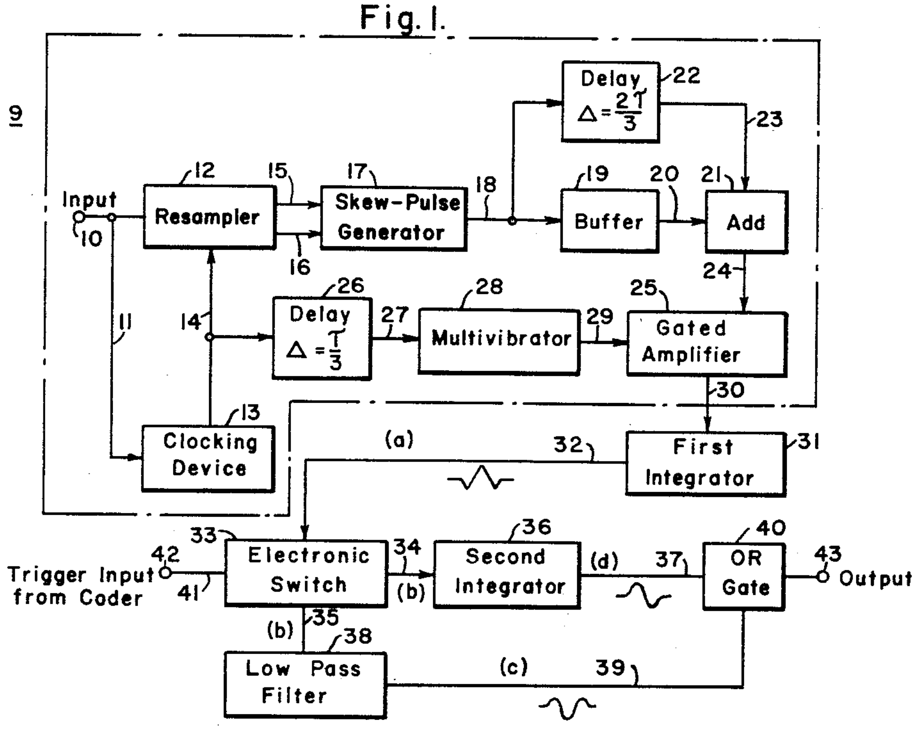
Fig.3.
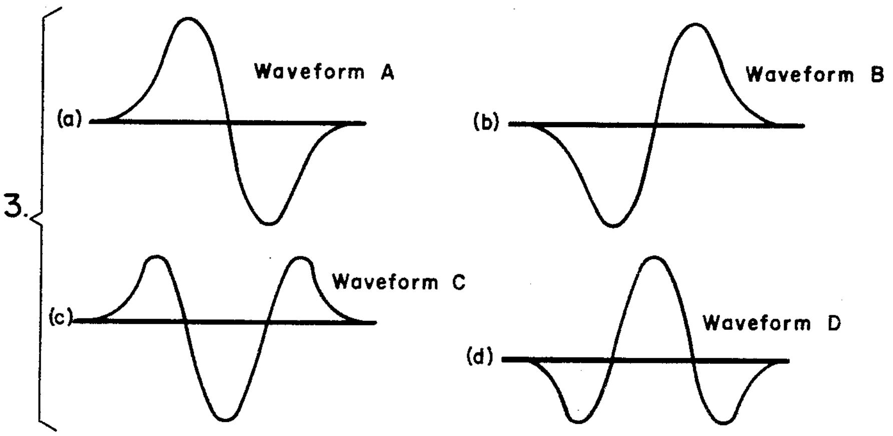
WITNESSES
Wm. B. Sellers.
James F. Young
Fig. 4.
| Binary Input | 11 | 10 | 01 | 00 |
|---|---|---|---|---|
| Output Waveform | A | B | C | D |
INVENTORS
Erich H. Scherer.
BY F. N. Cleary
ATTORNEY United States Patent Office 3,048,784
Patented Aug. 7, 1962

3,048,784

BINARY INPUT-A.C. WAVE OUTPUT SELECTOR USING BIPOLAR GENERATOR, INTEGRATOR, AND LOW PASS FILTER

Erich H. Scherer, Silver Spring, Md., assignor to Westinghouse Electric Corporation, East Pittsburgh, Pa., a corporation of Pennsylvania Filed Oct. 9, 1959, Ser. No. 845,518
4 Claims. (Cl. 328—27)

This invention relates to a waveform generator, and more particularly to a generator for selectively producing four signals having discrete bipolar symbolic waveforms.

In copending application Serial No. 833,450, filed August 13, 1959, by Richard F. J. Filipowsky, entitled "Signal Transmission System," assigned to the present assignee, there is disclosed a transmission system for transmitting binary information. The transmission system disclosed employs four discrete symbolic waveforms for transmitting information. In the system, the binary information is converted to one of four bidirectional symbolic waveforms and due to the bandwidth of the signals, the information rate of the system is greater than the information rate of conventional binary transmission for the same bandwidth. Additionally, these waveforms are D.C. free so that no restorer equipment is required. Additionally, the shape of the waveforms enable accurate detection.

Accordingly, an object of the invention is to provide a new and improved signal generator apparatus for producing a bidirectional waveform of a preselected shape.

Another object of the invention is the provision of a new and improved generator apparatus for selectively producing a plurality of bidirectional symbolic waveforms which are discrete and have a relatively narrow bandwidth.

A still further object of the invention is the provision of a generator which produces a plurality of signal waveforms of a preselected shape for use in transmitting information.

The nature and substance of the present invention is apparatus for converting binary information into symbolic waveforms. A generator waveform selected in accordance with binary input information is selectively applied to integrating means or a low pass filter in response to other binary input information.

Other objects and advantages will become apparent after a study of the following specification when read in connection with the accompanying drawings, in which:

FIGURE 1 illustrates a schematic diagram in block form of one embodiment of the invention;

FIG. 3 illustrates waveforms produced by the embodiment of the invention shown in FIG. 1; and FIG. 4 illustrates a chart useful in explaining the invention.

Figure 2:
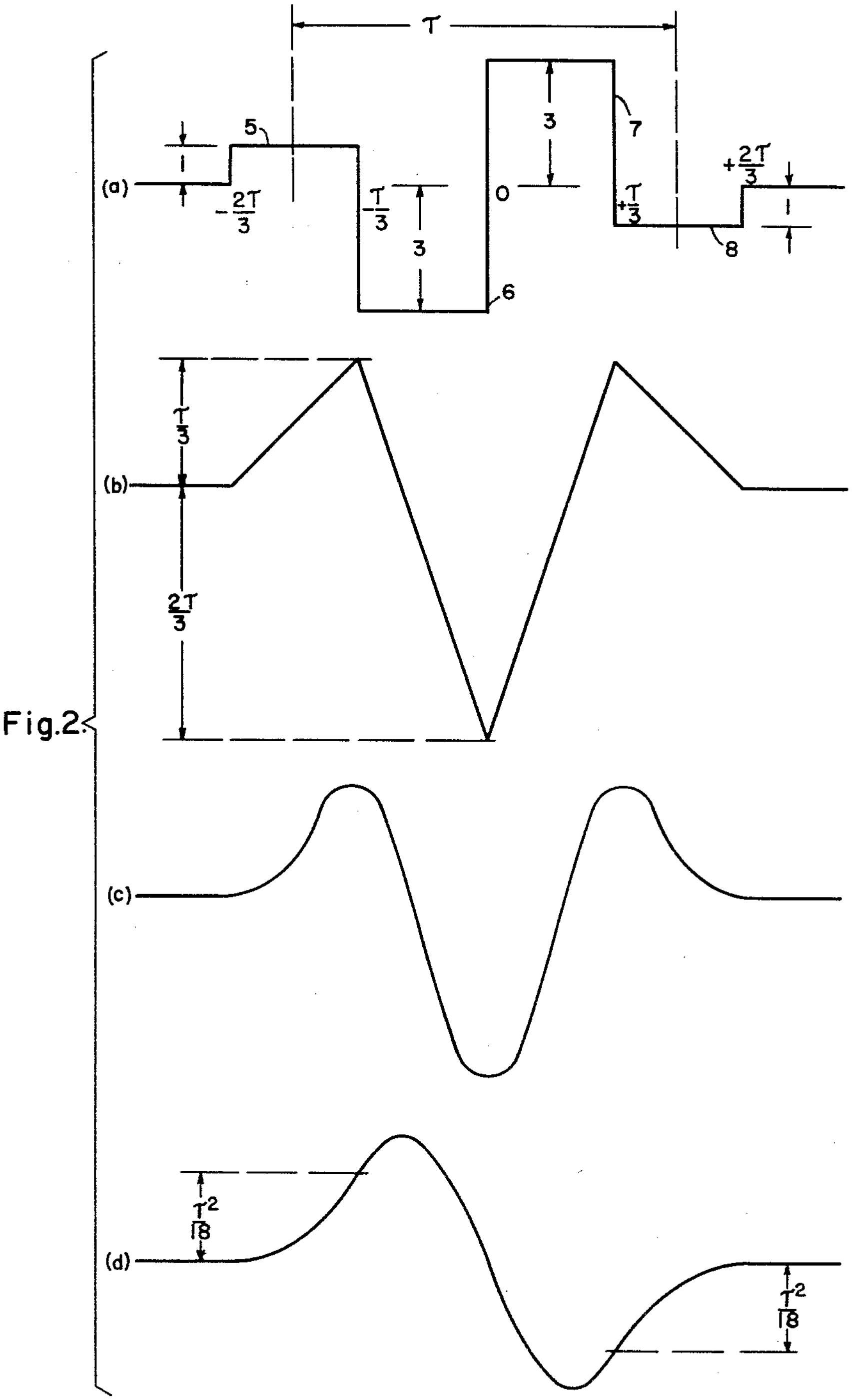
FIG. 2 illustrates waveforms which occur at various points of the apparatus shown in FIG. 1.

In the copending application entitled "Signal Transmission System," by Richard F. J. Filipowsky, filed August 13, 1959, there is described four waveforms for use in transmitting binary information. As described in this copending application, these waveforms are bipolar with gradually increasing and gradually decreasing leading and trailing edges. The beginning and end of these waveforms have a first derivative of equal to zero. Further, these waveforms are made up of sine type waves. As such, the bandwidth of these waveforms is relatively narrow. Additionally, these waveforms are D.C. free, that is to say, they are bidirectional with the energy in one direction being equal to the energy in the other direction. Due to this direct current restoring equipment is unnecessary. Additionally, the power spectrum of these waveforms concentrates the power in the middle of the frequency spectrum so that cross talk and other interference is thereby avoided.

The present invention relates to a waveform generator which will produce the above discussed waveforms, which are illustrated in FIG. 3. The invention relates more specifically to a waveform generator which will selectively produce any one of the four waveforms disclosed in FIG. 3. For convenience these waveforms are referred to as waveforms A, B, C, and D.

More specifically, as shown in FIG. 1, the disclosed apparatus includes a pattern generator 9 shown in dotted lines, which produces an output waveform illustrated in FIG. 2(*a*). This waveform is produced on the output lead 30 from the gated amplifier 25. The generator 9 will produce either this waveform or an inversion of this waveform depending upon the input signal applied to input terminal 10. The operation of this portion of the apparatus is more specifically described in copending application Serial No. 731,907 entitled "Generator for Converting Pulsed Signals Into Signals Having Parabolic Skew Waveforms," filed April 30, 1958, by Richard F. J. Filipowsky and Henry A. Musk. It is understood that this particular waveform could be produced in other ways and that this specific portion of the apparatus forms no part of the present invention.

As stated above, the output waveform shown in FIG. 2(*a*), will appear at the output of gated amplifier 25 in the form shown in 2(*a*) or in an inverted form, depending upon the input applied to input 10. This waveform consists of a first portion 5, a second portion 6, a third portion 7, and a fourth portion 8. All these portions as shown in FIG. 2(*a*) are equal in time length, and provide a continuous waveform of contiguous rectangular shaped pulses of alternately opposite polarity. That is, the length of these waveforms or of these portions is $$\frac{\tau}{3}$$

as shown in FIG. 2(*a*). The first and fourth portions 5 and 8 are opposite in polarity but equal in amplitude. The second and third portions 6 and 7, are also equal in amplitude and opposite in polarity. The amplitude of the second and third portions 6 and 7 is three times the amplitude of the first and fourth portions. As can be seen from FIG. 2(*a*) the second portion 6 is opposite in polarity to the first portion 5. Hence, it is seen that the portions alternate in polarity.

The waveform shown in FIG. 2(*a*), or its inversion, is passed from gated amplifier 25 through conductor 30 to a first integrator 31. The output of the first integrator 31 produces a waveform as shown in FIG. 2(*b*) or its inversion. The waveform shown in FIGS. 2(*a*) and 2(*b*) are shown in FIG. 5 of the above copending application Serial No. 731,907. It is understood that the output waveform of the generator shown in this copending application, could overlap the waveforms A and B shown in FIG. 3, as disclosed in copending application 731,907, or these waveforms could be employed in their entirety to pass information without overlapping as disclosed in FIG. 4(*m*) of application Serial No. 731,907. This can be done merely by adjusting the output of clocking device 13.

As shown in FIG. 1, the output of first integrator 31 is fed to an electronic switch 33 by a conductor 32, so as to pass the waveform shown in FIG. 2(*b*) through this electronic switch. The electronic switch 33 is connected through a conductor 34 to a second integrator 36. The electronic switch 33 is also connected to a low pass filter 38 through a conductor 35. The output of the second integrator 36 is connected through a conductor 37 to an or gate 40. The output of the low pass filter 38 is connected to the or gate 40 through a conductor 39. The or gate has output terminal means 43.

The electronic switch 33 is employed to selectively connect the output of the first integrator 31 either to the second integrator 36 or the low pass filter 38. As can be understood, when the first integrator 31 is connected to the second integrator 36 through the electronic switch 33, the operation of the device will be similar to the device disclosed in above mentioned copending application Serial No. 731,907. The electronic switch is controlled by a trigger input from a coder which is applied to a terminal 42 through lead means 41 to the electronic switch 33. This control enables selectively applying the output of the first integrator, namely the waveforms shown in FIG. 2(*b*) either to the second integrator 36 or the low pass filter 38. When the electronic switch 33 connects the first integrator 31 to the second integrator 36 the output at the output terminal means 43 will either be waveform A as shown in FIG. 3(*a*) or waveform B as shown in FIG. 3(*b*) depending upon the input applied to input terminal means 10. In the present device, the output of the first integrator 31 can also be selectively passed through a low pass filter 38. This results in the waveform shown in FIG. 2(*b*) being applied or passed through a sharp low pass filter 38. By applying the waveform FIG. 2(*b*) to a low pass filter, the high frequency components of the waveform shown in FIG. 2(*b*) will be eliminated and the resulting waveform will appear as the waveform illustrated in FIG. 2(*c*). Thus it is seen by employing the output of the first integrator, shown in FIG. 2(*b*), and passing it through a low pass filter, the resulting waveform is one which closely approximates the triple raised cosine or C waveform mentioned in the above-entitled application "Signal Transmission System," by Richard F. J. Filipowsky, Serial No. 833,450.

The present invention can be employed to convert binary information into the symbolic waveforms shown in FIG. 3 by applying a mark or space to the input 10 and additionally synchronizing this with a trigger input pulse to the input terminal means 42 to thereby select one of the four waveforms shown in FIG. 3. By proper switching arrangement and application of the binary information to the apparatus shown in FIG. 1, the output waveform A could as shown in FIG. 4 correspond to a "mark mark" binary input wherein the second mark is received by the terminal means 42 so as to switch the output of first integrator 31 to the input of second integrator 36 thereby producing waveform A. The other three combinations of two binary inputs could be similarly applied to the input terminal means 10 and 42 so as to produce at the output terminal 43 three discrete symbolic waveforms B, C and D shown in FIG. 3 which would correspond to the other three combinations of two binary inputs, as illustrated in FIG. 4.

It is to be understood that certain alterations, modifications and substitutions may be made in the instant disclosure without departing from the spirit and scope of the invention.

I claim as my invention:

1. Apparatus for producing a bipolar waveform comprising means for producing a bipolar waveform having a first, second, third and fourth portion, said portions being of uniform time width and rectangular in shape, said first and fourth portions being of opposite polarity, said second and third portions being of opposite polarity and approximately three times the magnitude of said first and third portions, means for integrating said waveform and means for removing the high frequency component from said waveform after being integrated.

2. Apparatus for producing a plurality of bipolar waveforms comprising generator means for producing a bipolar waveform, said waveform having a first, second, third and fourth contiguous portions, said portions being of equal time length and rectangular in shape, said first and fourth portions being opposite in polarity and equal in magnitude, said second and third portions being opposite in polarity and equal in magnitude, the magnitude of said second and third portions being three times the magnitude of said first and fourth portions, the polarity of said second portion being opposite to the polarity of said first portion, integrating means, a low pass filter, and switching means for selectively applying the output of said generator means to said integrating means or to said low pass filter.

3. Apparatus for producing a plurality of bipolar waveforms comprising generator means for producing a bipolar waveform, said waveform including a plurality of contiguous rectangular shaped pulses of alternately opposite polarity, a first integrating means for integrating said waveform, a second integrating means, a low pass filter, and switching means for selectively applying the output of said first integrator means to said second integrator means or to said low pass filter.

4. Apparatus for producing a plurality of bipolar waveforms comprising generator means for producing a bipolar waveform, said waveform including a first, second, third and fourth portion, said rectangular pulses being equal in time width, said first and fourth portions being of opposite polarity and equal in magnitude, said second and third portions being opposite in polarity, the magnitude of said second and third portions being three times the magnitude of said first and fourth portions, said second portion being opposite in polarity to said first portion, first integrating means for integrating said waveform, second integrating means for integrating the output of said first integrating means when connected thereto, a low pass filter, and switching means for selectively applying the output of said first integrator means to said second integrator means or to said low pass filter.

References Cited in the file of this patent

UNITED STATES PATENTS

| | | |
|---|---|---|
| 2,617,879 | Sziklai | Nov. 11, 1952 |
| 2,784,256 | Cherry | Mar. 5, 1957 |
| 2,806,949 | Smith | Sept. 17, 1957 |
| 2,896,162 | Berger et al. | July 21, 1959 |
| 2,936,420 | Tyler | May 10, 1960 |